United States Patent
Mcilroy

(10) Patent No.: US 7,793,493 B1
(45) Date of Patent: Sep. 14, 2010

(54) TURBOCHARGED INTERNAL COMBUSTION/STEAM HYBRID ENGINE

(76) Inventor: Robert Mcilroy, 37651 Newport Dr., Zephyrhills, FL (US) 33542

( * ) Notice: Subject to any disclaimer, the term of this patent is extended or adjusted under 35 U.S.C. 154(b) by 0 days.

(21) Appl. No.: 12/592,895

(22) Filed: Dec. 4, 2009

(51) Int. Cl.
F02B 35/00 (2006.01)

(52) U.S. Cl. .............................. 60/315; 60/775; 60/614

(58) Field of Classification Search ........... 60/614–624, 60/606, 613, 315–320, 272–324
See application file for complete search history.

(56) References Cited

U.S. PATENT DOCUMENTS

| | | | | |
|---|---|---|---|---|
| 1,373,509 A | * | 4/1921 | Killman | 60/618 |
| 4,031,705 A | * | 6/1977 | Berg | 60/615 |
| 4,433,548 A | * | 2/1984 | Hallstrom, Jr. | 60/712 |
| 4,442,673 A | * | 4/1984 | Haworth | 60/618 |
| 4,901,531 A | * | 2/1990 | Kubo et al. | 60/618 |
| 5,261,238 A | * | 11/1993 | Olsen | 60/620 |
| 5,724,814 A | * | 3/1998 | Ven et al. | 60/618 |
| 5,875,633 A | * | 3/1999 | Lawson, Jr. | 60/618 |

* cited by examiner

Primary Examiner—Thomas Denion
Assistant Examiner—Douglas J. Duff

(57) ABSTRACT

An engine (FIG. 1-1) comprising of multiple cylinders designated (2-5) combustion cylinders and (2-6) for heat recovery steam cylinders, each cylinder having a piston connected to a common crankshaft. The combustion cylinders operate on a four stroke cycle and the heat recovery steam cylinders operate on a two stroke cycle. The exhaust gas from the combustion cylinders is pressurized by a compressor, driven by a turbine, before entry into the heat recovery steam cylinders. This happens during the intake/power stroke of the heat recovery steam cylinders, as the intake valve closes, after top dead center, heated pressurized water is injected into the cylinder and spontaneously turns to steam driving the receding piston down. This heated exhaust gas and steam is expelled from the heat recovery steam cylinders to drive the turbine which in turn drives two compressors, one to compress the exhaust gas and one to compress the intake air.

2 Claims, 3 Drawing Sheets

| | | |
|---|---|---|
| 1 BLOCK | 8 TURBO | 15 FAN |
| 2 CYLINDER | 9 EX GAS COMP | 16 GAS/STEAM INLET |
| 3 INT VALVE | 10 HOLDING CHAM | 17 WATER INJ |
| 4 EX VALVE | 11 HEAT EXCH | 18 WATER INJ |
| 5 FUEL INJ | 12 INJ TANK | 19 PUMP |
| 6 WATER INJ | 13 RAD/COND | 20 HEAT EXCH |
| 7 INTAKE COMP | 14 MED PUMP | |

Shows Steam Cylinders 120 degrees
out of phase with the adjoining Combustion Cylinder Shows Steam Cylinders 120 degrees out of phase with the adjoining Combustion Cylinders

TURBOCHARGED INTERNAL COMBUSTION/STEAM HYBRID ENGINE

BACKGROUND OF THE INVENTION

The invention relates to multi-cylinder reciprocating internal combustion engines.

The reciprocating internal combustion engine has considerable inherent deficiencies which account for the waste of most of the heat produced from the combustion of the hydrocarbon fuel. This process also produces a large quantity of unfriendly gases that pollute the atmosphere. This invention is to make a marked improvement in the utilization of this heat and by absorbing gases and particulate matter make them easier to remove. With a turbocharger coupled to two separate compressors the engine would perform equivalent to or better than a four cylinder engine of similar size. Fuel economy would be immensely improved, and emissions significantly reduced.

Prior art shows that attempts have been made through six stroke engines and exhaust transfer within the cylinders and water injections to increase the efficiency of the engine but for various reasons none have achieved a production status.

SUMMARY OF THE INVENTION

Figure 1:
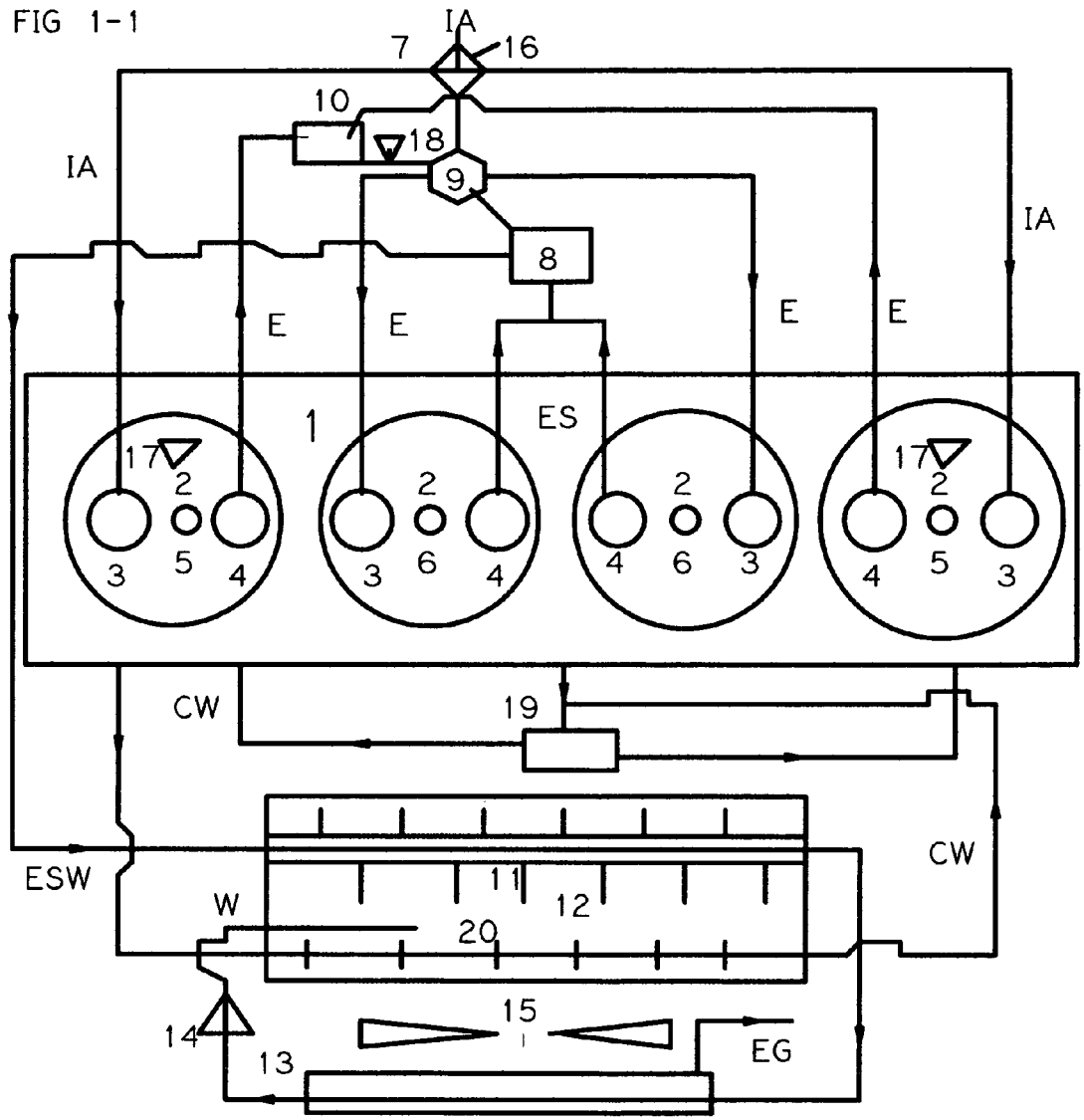

This invention was previously submitted as a Provisional Application 61279173 on 2009-10 16 In a four cylinder engine, FIGS. 1-1, there are two types of working cylinders, combustion and heat recovery steam. The combustion cylinders work on a four stroke cycle and the heat recovery steam cylinders on a two stroke cycle. Combustion ignition can be by electrical means or by compression ignition. Fuel supply can be by direct injection into the cylinder or injection into the intake port.

A turbocharger uses the exhaust gas and steam from the heat recovery cylinders to obtain energy and drives 1) a compressor which would boost the intake air to the combustion cylinders and 2) a compressor that pressurizes the exhaust gas coming from the combustion cylinders before entry into the heat recovery cylinders. Medium pressure hot water is then injected into the heat recovery steam cylinders just after top dead center and instantaneously flashes to steam on the intake/power stroke of these cylinders.

This invention is to recover a large portion of the lost heat and also reduce pumping and friction losses in the heat recovery steam cylinders, the two stroke part of the engine. In this case, from the same fuel being consumed by the two combustion cylinders producing two power strokes, four power strokes would be gained from the heat recovery steam cylinders, pumping losses would be almost eliminated in these cylinders and friction reduced by at least 50% and therefore an increase in total efficiency to an acceptable level.

For optimum efficiency it is required that the temperature of the coolant and the injection water be above 250 degrees F. therefore a high temperature synthetic oil would gain preference.

To combat the production of contaminants, caused by high temperature combustion, two methods are included a) the introduction of exhaust gas and steam through the intake air compressor 16 and the injection of cool water through the injectors in the combustion cylinder heads 17 and in the holding chamber to cool the compressor 18. These systems only operate when the engine controller detects high temperature combustion.

The gains in efficiency would come from the high temperature of the working engine and the insulation keeping the heat in circulation. The same heat would be used till depleted where at present it used once and rejected as high temperature exhaust gas or radiator losses. The only significant heat lost would be 1) to the exhaust gas at 200 degrees F., which is already only one half the volume of that of a conventional engine, 2) the effect of the cooling fan and 3) the heat lost through the insulation of the engine.

DESCRIPTION OF SCHEMATIC DRAWINGS

FIG. 1-1 Schematic Diagram of Gas Steam flow. Showing the layout as a plan. The arrows indicate the flow of the fluids through the engine, whether exhaust gas E, exhaust/steam ES or exhaust/steam/water ESW. The air flow is designated by IA and coolant water CW. In the diagram the block is designated 1, cylinders are indicated by 2, intake valves as 3, exhaust valves as 4, fuel injectors as 5, hot water injectors as 6, intake air as 7, turbocharger as 8, exhaust gas compressor as 9, holding chamber 10, heat exchanger 11, injection water tank 12, radiator/condenser 13, medium pressure pump 14, cooling fan 15, air intake compressor 16, water injectors in combustion cylinders 17, compressor cooling injector 18, coolant pump 19, coolant water heat exchanger 20. A drive shaft is shown through 8, 9 and 16.

Figures 1, 2:
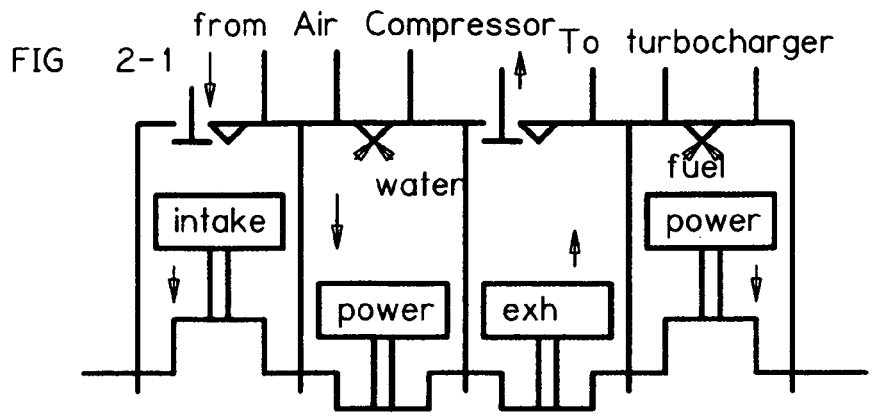
Figure 2:
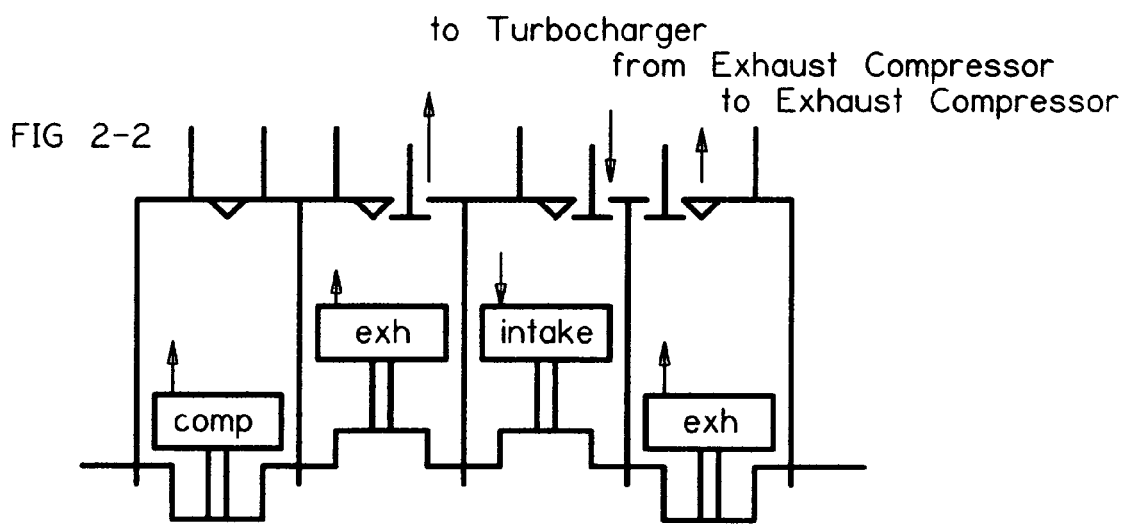
Figures 1, 3:
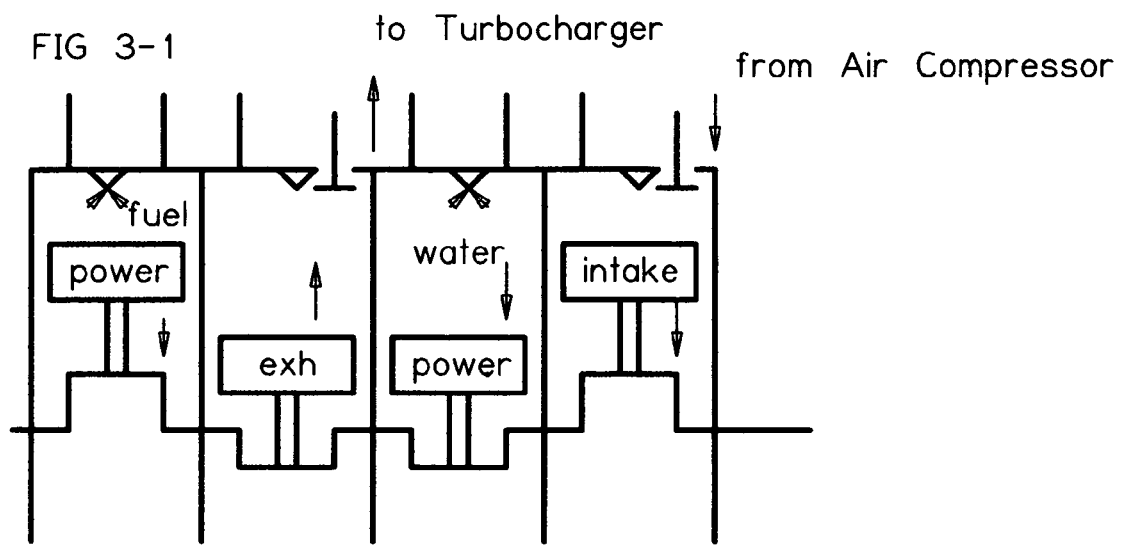
Figures 2, 3:
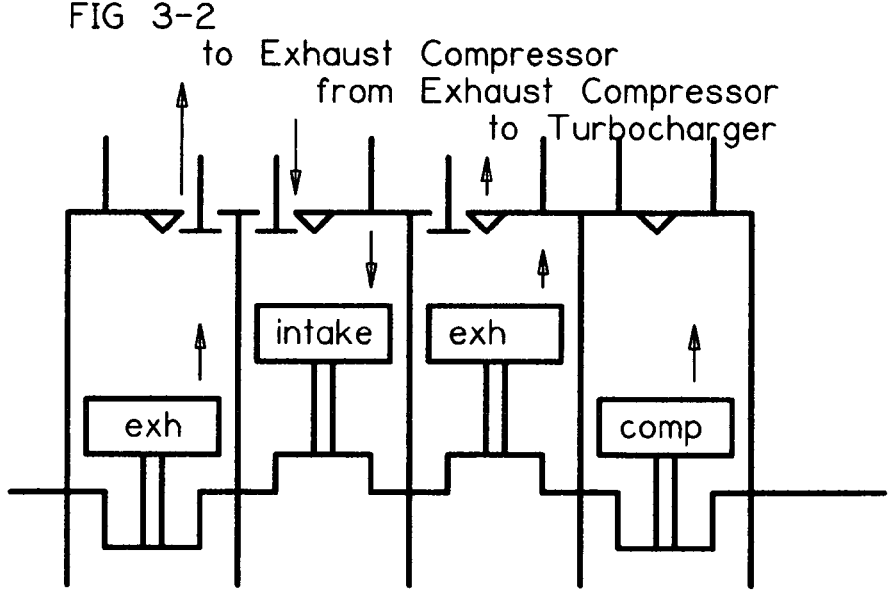

FIG. 2-1 Shows the first stroke of the four stroke cycle.
FIG. 2-2 Shows the second stroke of the four stroke cycle.
FIG. 3-1 Shows the third stroke of a four stroke cycle.
FIG. 3-2 Shows the fourth stroke of a four stroke cycle

DETAILED DESCRIPTION

FIG. 1-1 In the conventional compression ignition four cylinder in line engine block 1 shown, two cylinders would be combustion cylinders and two would be heat recovery steam cylinders. The combustion cylinders 2-5, would be 360 degrees out of phase with each other, and the heat recovery cylinders 2-6, 120 degrees out of phase with each other and 120 degrees out of phase with their adjoining combustion cylinder. This would produce six power strokes for every two revolutions of the engine, and an almost vibration free quiet smooth running engine.

The camshaft of this engine has been modified so that both cylinders 2-5, operate as four stroke cylinders while the inner two 2-6, as two stroke cylinders with double camshaft lobes for each valve, intake and exhaust. Another modification to the camshaft makes the two center cylinder intake valves 3, to have a low lift and duration of lift.

a) Combustion cylinders 2-5, which operate on an Otto cycle have four strokes, intake, compression, combustion and exhaust and the camshaft moves the valves to accomplish this. These cylinders burn a hydrocarbon fuel and produce motive force, but they also release a considerable amount of high temperature reusable heat in the exhaust gas. The exhaust gas from these cylinders exit into an insulated holding chamber.10.

b) Heat recovery steam cylinders, the inside the cylinders, 2-6, operate on a two stroke cycle and take the exhaust gases of the combustion cylinders from the holding chamber 10. This gas is then forced by the compressor 9 into the cylinder on the intake/power stroke, just after top dead center. The intake valve 3, with a lift of less than 40% of the normal, opens for less than one third of the downward stroke. Just as the intake valve 3 completely closes, electronically activated injectors force pressurized hot water and additives, into the cylinders This amount of water is proportional to the fuel supplied to the outside cylinders. This flashes to steam instantaneously and raises the pressure in the cylinder pushing the receding piston down. This early injection of water would have a secondary effect of cooling the intake valve. Under low to medium load, on the way down and near the bottom of the stroke the mixture of steam and gas extracts heat from the cylinder walls and coolant. At bottom dead center of the heat recover steam cylinders the exhaust valve 4, opens and the gas/steam is passed through the exhaust ports as the piston rises.

c) FIGS. 1-1. On leaving the heat recovery steam cylinders, this large volume of high velocity gas/steam exhaust is muted to drive a turbocharger 8, which uses the energy recovered to drive compressors 9 and 16. This compressor 9 is connected to the combustion cylinders exhaust gas holding chamber 10, and in turn pressurizes the exhaust gas as it leaves the holding chamber 10 and forces it into the heat recovery steam cylinders.

d) The gas/steam exhaust is then routed from the turbocharger through a heat exchanger 11, in the pressurized insulated injection water storage tank 12, to again recover energy from the exhaust. The injected water should be well above boiling point and at a pressure that would allow injection into the cylinder. In the heat exchanger the temperature is further reduced and turns the exhaust to water, saturated steam and exhaust gas.

e) In this system, under heavy load, some of the exhaust gas and steam is re-circulated by adding it to the intake of the compressor 16 and mixed with the intake air before entry into the combustion chamber to lower combustion temperatures and NOX emissions.

f) The remaining majority passes through the radiator/condenser 13, to be returned to water and exhaust gas. Like rainwater, particulate matter and carbon dioxide are absorbed into the steam and water which becomes a mild carbonic acid. The water is filtered and purified and then returned to the injection water storage tank through a medium pressure pump 14, or to electronically controlled injectors in the combustion cylinders 17 and in the exhaust gas compressor 18. These injectors, operated by the engine controller, only operate under high temperature conditions, as the combustion cylinder intake valve opens. The exhaust gas goes to atmosphere. The fan 15, is used to help cool the condenser and the engine block.

g) The coolant water in the block is circulated in the coolant passageways, by a pump 19, pushed from the bottom of the combustion cylinders up to the cylinder head then through the head of the heat recovery steam cylinders and down to the bottom of the heat recovery steam cylinders. A separate line runs from the top of the combustion cylinders through the insulated injection water tank heat exchanger 20. and back to the bottom of the heat recovery cylinders. This to keep heat recovery cylinders and injection tank water at an elevated operating temperature.

h) To capture as much water vapor as possible in hot weather, the air conditioning system partially circulates through the condenser providing a cold surface to remove more moisture from the exhaust.

What is claimed of this invention are as follows:

1. A turbocharged combined internal combustion and steam engine of multiple cylinders comprising of combustion and heat recovery steam cylinders wherein a reciprocating piston in each cylinder drive a common crankshaft and a means that allows the said combustion cylinders to operate in a four stroke cycle mode of operation and the said heat recovery steam cylinders to operate in a two stroke mode of operation, with predetermined lift and predetermined duration of opening of the intake valves, wherein the exhaust gas from the combustion cylinders, held in a holding chamber, is forced by a compressor into the heat recovery steam cylinders as the intake valve opens for a predetermined period of time and as the valve closes electronically controlled injectors spray pressurized heated water, from the injection water holding tank, into the heat recovery steam cylinders, the said water spontaneously turns to steam driving the said piston down wherein the exhaust valve opens at the bottom of the stroke and the exhaust gas and steam released the heat recovery cylinders herein to drive a turbine which in turn drives the said compressor that compressed the exhaust gas going into the heat recovery cylinder and a compressor that boosts the pressure of the intake air.

2. As in claim 1, wherein the exhaust gas and steam of the heat recovery steam cylinders exit from the turbine into a heat exchanger located in the pressurized injection water storage tank to remove heat from the mixture and condense said gas and steam into gas, saturated steam and water thereby raising the temperature of the injection water therein, the saturated steam and water and exhaust gas are further reduced to exhaust gas and water and by passing them through a condenser/radiator with fan cooling, the exhaust gas is ventilated to atmosphere and the water purified and filtered and returned through a water pressure pump to the said pressurized injector water storage tank and to electronically controlled water injectors in the combustion cylinders and in the exit from the said holding chamber these said injectors only function when predetermined load and predetermined temperature conditions exist.

\* \* \* \* \*